(12) United States Patent
Craig

(10) Patent No.: US 8,056,512 B2
(45) Date of Patent: Nov. 15, 2011

(54) PET ENCLOSURE GATE

(76) Inventor: Cheri Craig, Bulls Gap, TN (US)

(*) Notice: Subject to any disclaimer, the term of this patent is extended or adjusted under 35 U.S.C. 154(b) by 74 days.

(21) Appl. No.: 12/573,186

(22) Filed: Oct. 5, 2009

(65) Prior Publication Data

US 2011/0079181 A1    Apr. 7, 2011

(51) Int. Cl.
*A01K 1/00* (2006.01)
(52) U.S. Cl. ......... 119/501; 119/416; 119/502; 434/99
(58) Field of Classification Search ........... 119/416, 119/482, 501, 516, 524, 720, 165, 705, 502, 119/512; 40/586, 539; 49/70, 400, 404, 49/501; 482/15–17; 160/188–189, 199, 160/201, 229.1, 135, 116, 180, 237; 434/99
See application file for complete search history.

(56) References Cited

U.S. PATENT DOCUMENTS

| | | | |
|---|---|---|---|
| 599,063 A | 2/1898 | McCauley | |
| 817,983 A * | 4/1906 | Noblett | 160/207 |
| 929,980 A | 8/1909 | Popper | |
| 1,604,593 A | 6/1926 | Nechamkin et al. | |
| 2,499,450 A * | 3/1950 | Bergman | 434/99 |
| 2,519,922 A * | 8/1950 | Newbury | 434/99 |
| 3,463,577 A * | 8/1969 | Friedberg | 359/855 |
| 3,918,203 A * | 11/1975 | Ellison, Jr. | 49/168 |
| 4,112,594 A * | 9/1978 | Impastato | 434/104 |
| 4,838,525 A * | 6/1989 | Snow et al. | 256/26 |
| 5,056,796 A | 10/1991 | Conville | |
| 5,979,366 A * | 11/1999 | Cook | 119/702 |
| 6,035,919 A * | 3/2000 | Zinbarg | 160/113 |
| 6,311,955 B1 * | 11/2001 | McGarry et al. | 256/24 |
| 6,408,865 B1 * | 6/2002 | Bliss | 135/118 |
| 6,523,288 B1 | 2/2003 | Sackett | |
| 6,711,854 B1 * | 3/2004 | Andersen | 49/57 |
| 6,932,344 B1 | 8/2005 | Soto | |
| 7,121,290 B2 * | 10/2006 | Eastman, II | 135/121 |
| 7,222,587 B2 * | 5/2007 | Hagel | 119/482 |
| D544,926 S * | 6/2007 | Kassens | D21/506 |
| 7,275,532 B2 * | 10/2007 | Niemackl et al. | 124/86 |

* cited by examiner

*Primary Examiner* — Rob Swiatek
*Assistant Examiner* — Ebony Evans
(74) *Attorney, Agent, or Firm* — Pitts, Lake & Bell, P.C.

(57) ABSTRACT

A gate for a pet enclosure having limited visibility from inside the enclosure of events taking place outside the enclosure. In one embodiment, the gate of the present invention is formed from a plurality of removable panels which define an outer facial surface of the gate. At least one portal is provided in the gate for limited protrusion of a pet's face into the portal only to the extent of the nose and eyes of the pet. The portal is provided about its perimeter with an artistic which enhances the outer appearance of the gate itself, and when associated with a pet animal's partial exposure within the portal, provides a striking and enjoyable, sometimes comical, visual alteration of the facial surface of the gate. In various embodiments, the artistic associated with a given portal in the gate may be changed employing plural artistics which are arrayed on a moveable mount which positions selected artistics in register with selected ones of a plurality of portals defined in the gate. Differently sized and spaced apart portals in the gate provide opportunities for differently sized pets to simultaneously or individually enjoy peeking at events taking place outside the enclosure.

4 Claims, 8 Drawing Sheets

PET ENCLOSURE GATE

CROSS-REFERENCE TO RELATED APPLICATIONS

Background of the Invention

This invention relates to structures (enclosures) for containing animals, particularly pets, and more particularly dogs, (hereinafter "pets"). Commonly, pets are kept in outdoor enclosures which vary widely in design, for example, fenced areas, pet houses, and the like. Such enclosures most usually are provided a gate or door for entering and exiting the enclosure. Many such enclosures are opaque with respect to the ability of a contained pet being allowed to view events taking place outside the enclosure.

Pets contained within a enclosure tend to want to observe events taking place adjacent to, but outside, their enclosure, particularly events taking place in the outside ambient environment proximate the gate. For example, pets associate the sound of a pet owner approaching the gateway of the enclosure with pleasant happenings, such as feeding. In similar manner, pets seek ways to watch persons involved in an event outside the enclosure, such as swimming in an adjacent pool, children playing outside the enclosure, etc. Such curiosity on the part of the pet can lead to the pet taking measures to seek a way to get out of the enclosure, and particularly, to gain visual access to the event(s) taking place outside their enclosure. This effort of the pet can lead to noises made by the pet, etc., which can be undesirably disruptive of the event taking place outside the enclosure, such as the barking of a dog, and/or the pet attempting to escape the enclosure, such as by scratching on a gate, etc.

Not uncommonly, the gate (and/or a fence) employed to contain a pet, obscures or blocks, the visual access of the pet to the ambient environment on that side of the gate opposite the location of the pet, i.e., outside the enclosure. Whereas a wire fence may serve to contain a pet, the pet's eyes are never free of the shadow of one or more stands of the wire fence, thereby failing to provide the pet with a "full" view of an event taking place outside the enclosure. Likewise with a board fence, a vertical space between adjacent boards of the fence may book one of the pet's eyes, or a horizontal space between such boards may not provide full visual access of the pet's eyes in that the pet's nose tends to preclude proper positioning of the pet's eyes as prevents blocking of some portion of the event taking place outside the enclosure, so that the pet fails to get a "complete" full view of the event using both eyes. Merely providing a sizable open space through a gate or fence of the enclosure for the pet to look through, tends to deface the wall or gate and presents an undesirable overall appearance of the enclosure.

Moreover, such gates can be rather bland and unsightly. Glassed-in or other transparent windows defined in the gate, for example, soon become dirty and unsightly, and often are scratched upon by the pet to the extent that the window looses its transparency.

SUMMARY OF THE INVENTION

In accordance with one aspect of the present invention, the present inventor has discovered that with most pets, a mere full vision peek of what is present or taking place outside a retention enclosure can be sufficient to satisfy the pet's curiosity or interest to the extent that the pet does not create a disturbance of such external activities. In one embodiment of the present invention, there is provided a gateway including an generally opaque gate providing for entry and exit to a pet enclosure. The gate may be constructed of a single front panel or of multiple panels, the latter being of tongue and groove side-by-side interconnecting capability, and which are individually removable mounted on a frame.

At least one portal of a size and shape (most commonly circular) suitable to permit the projection of not significantly more than the nose and eyes of a given pet into or through the portal, is defined through the thickness of the gate. In this matter, the pet is provided with a full view of events taking place outside the enclosure, is inhibited from disruptive maneuvers, is somewhat inhibited from uttering objectionable noises, such as barking, and is calmed by reason of their satisfaction of view in the event taking place outside the enclosure, all with continued retention of the pet within the enclosure.

In accordance with one aspect of the present invention about the perimeter of each portal and visible on the outer facial surface of the gate, there is provided an artistic expression so when the nose and eyes of the pet project through the portal, the pet's face takes on a unique, eye-appealing, or commonly comical, appearance. In one embodiment the artistic is chosen to display the face of the pet associated with the horns of a devil. In this artistic, when the pet's face is disposed within the portal, the horns appear to be attached to the pet's head.

Application or presentation of the artistic may take several forms, but in any event, the artistic substantially encircles the portal defined through the thickness of the gate. Moreover, the artistic may be permanently applied to the gate or may otherwise be replaceable as desired.

DETAILED DESCRIPTION OF THE INVENTION

Figure 1:
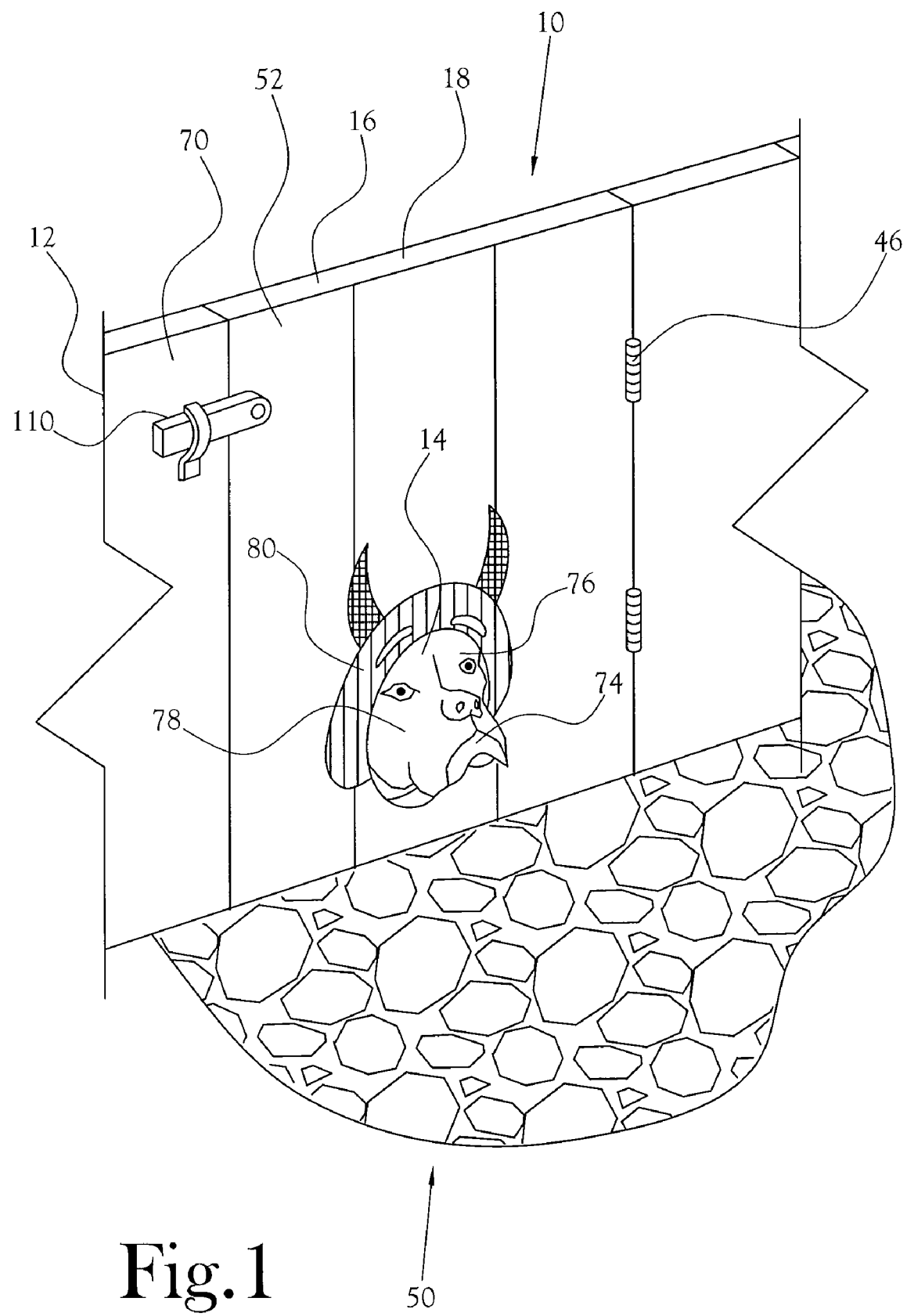
FIG. 1 is a perspective view of the outer facial surface of a non-transparent gate having one portal located near the bottom of the gate and which is artistically enhanced by a set of horns and depicting the face of a dog projecting through the portal when the dog is lying on its belly within the enclosure and looking out of the portal in the direction of a walkway approaching the gate.
Figure 2:
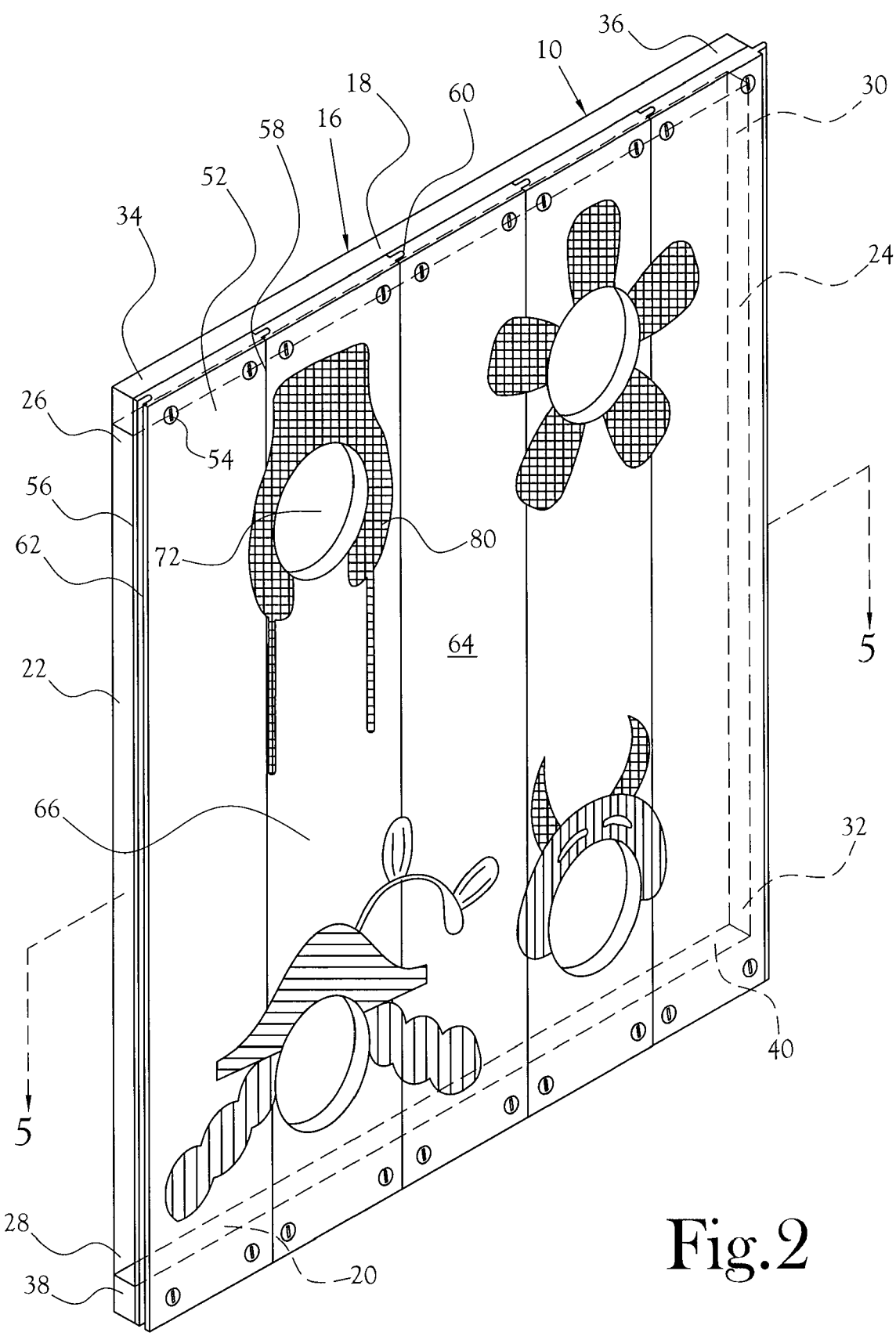
FIG. 2 is a perspective view of a gate as depicted in FIG. 1 and including multiple portals defined at spaced apart locations about the outer facial surface of a gate and depicting different artistics associated with different portals.
Figure 3:
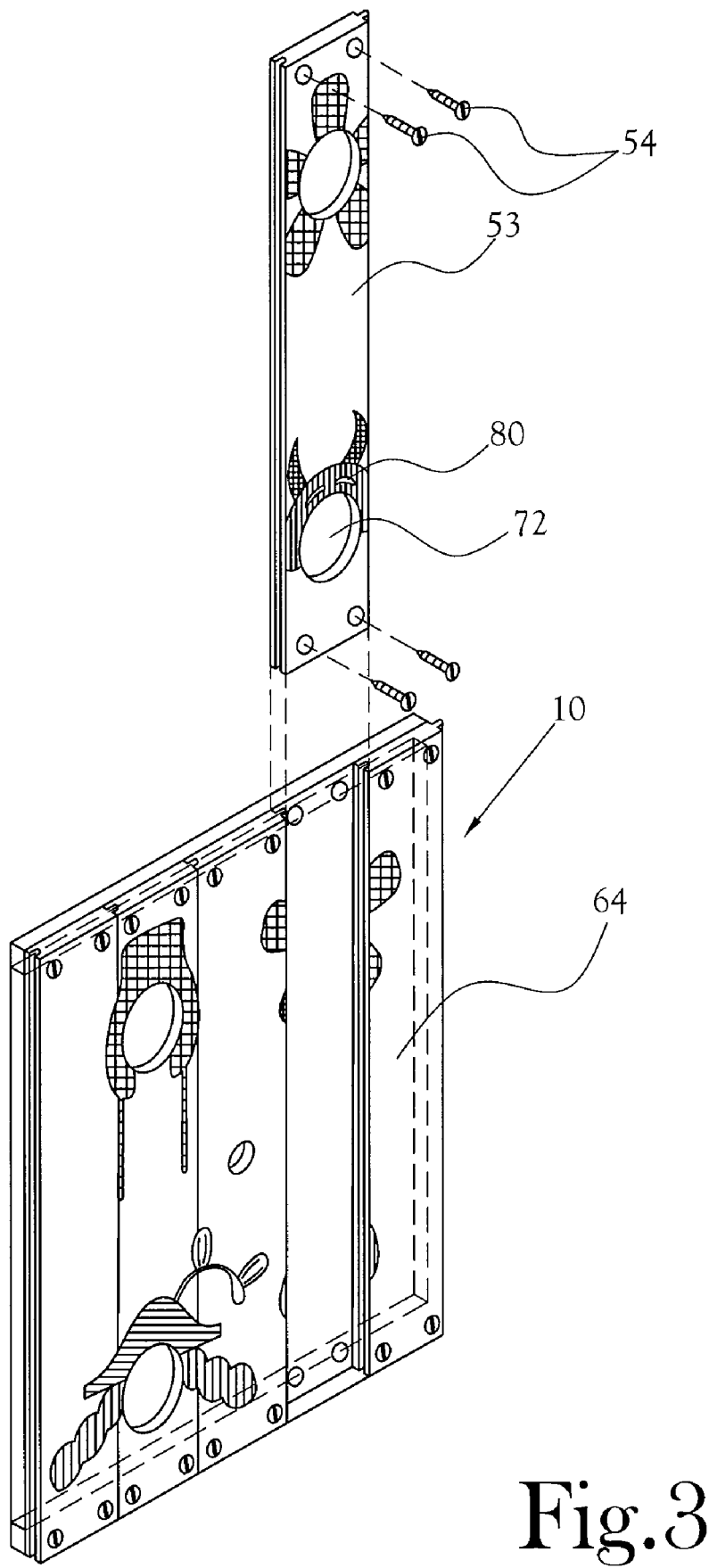
FIG. 3 is a partially exploded perspective view of a gate as depicted in FIG. 2 and including a plurality of tongue and groove panels defining the outer facial surface of the gate wherein one panel is withdrawn in anticipation of the insertion of a replacement panel.

With initial reference to FIG. 1-3, in one embodiment of the present invention there is provided a gate, 10, for a pet enclosure, 12, such gate normally providing an impediment to full view by a pet, 14, retained within the enclosure of an event taking place externally of the enclosure.

In accordance with one aspect of the present invention, the gate depicted in FIG. 1-3 comprises a frame, 16, defined by top rail, 18, a bottom rail, 20, (see FIG. 2) and first and second opposite side rails, 22, 24, whose opposite ends, 26, 28, and 30, 32, respectively are joined to respective opposite ends, 34, 36, and 38, 40, of the top and bottom rails. One of the side rails, side rail (2) 24, for example, may serve as a base for the mounting of one or more hinges, 46, (See FIG. 1) on the gate for hinged mounting of the gate on a fence post (not shown) in a wall of the enclosure, or other like structural element. In the embodiment depicted in FIG. 1, the gate is disposed proximate the end of a graveled walkway, 50, leading to the enclosure. It will be recognized by one skilled in the art that the enclosure with which the gate is associated, may be a common wire fence, a board fence, or other structural form, such as a pet house or pen which serves to retain the pet within a defined space and which impedes the ability of a pet retained in the enclosure from fully viewing an activity or event taking place outside the enclosure.

In the embodiment depicted in FIGS. 1-3, the gate of the present invention is formed by releasably anchoring an array of opaque or semi-opaque panels, 52, to the top and bottom rails of the frame as by screws, 54, or like fasteners. In the embodiment depicted in FIGS. 1-3, each panel is of a rectangular geometry having first and second opposite side edges, 56, 58. In the embodiment depicted in FIGS. 1-3, a first side edge of each panel is provided a tongue, 60, along the length dimension of the panel, and the second side edge of such panel is provided with a groove, 62, along the length dimension of the panel. To define the gate, the panels are aligned vertically in side by side relationship with the tongue of each panel being fitted into the groove of an adjacent panel so that when these interconnected panels are mounted on the frame, they collectively define a gate face plate, 64, having an outer facial surface, 66. Being releasably mounted on the frame, each panel may be extracted from the array of panels by removing the screws 54 and pulling the panel lengthwise out of the array (see FIG. 3, all without disruption of adjacent panels. If damaged, an extracted panel may be replaced with a like new panel or the extracted panel may be repaired, or otherwise changed, and then returned to its original position on the frame. Whereas the panels are depicted in FIGS. 1-3 as being vertically oriented, it will be recognized that, alternatively, such panels may be oriented horizontally.

Figure 4:
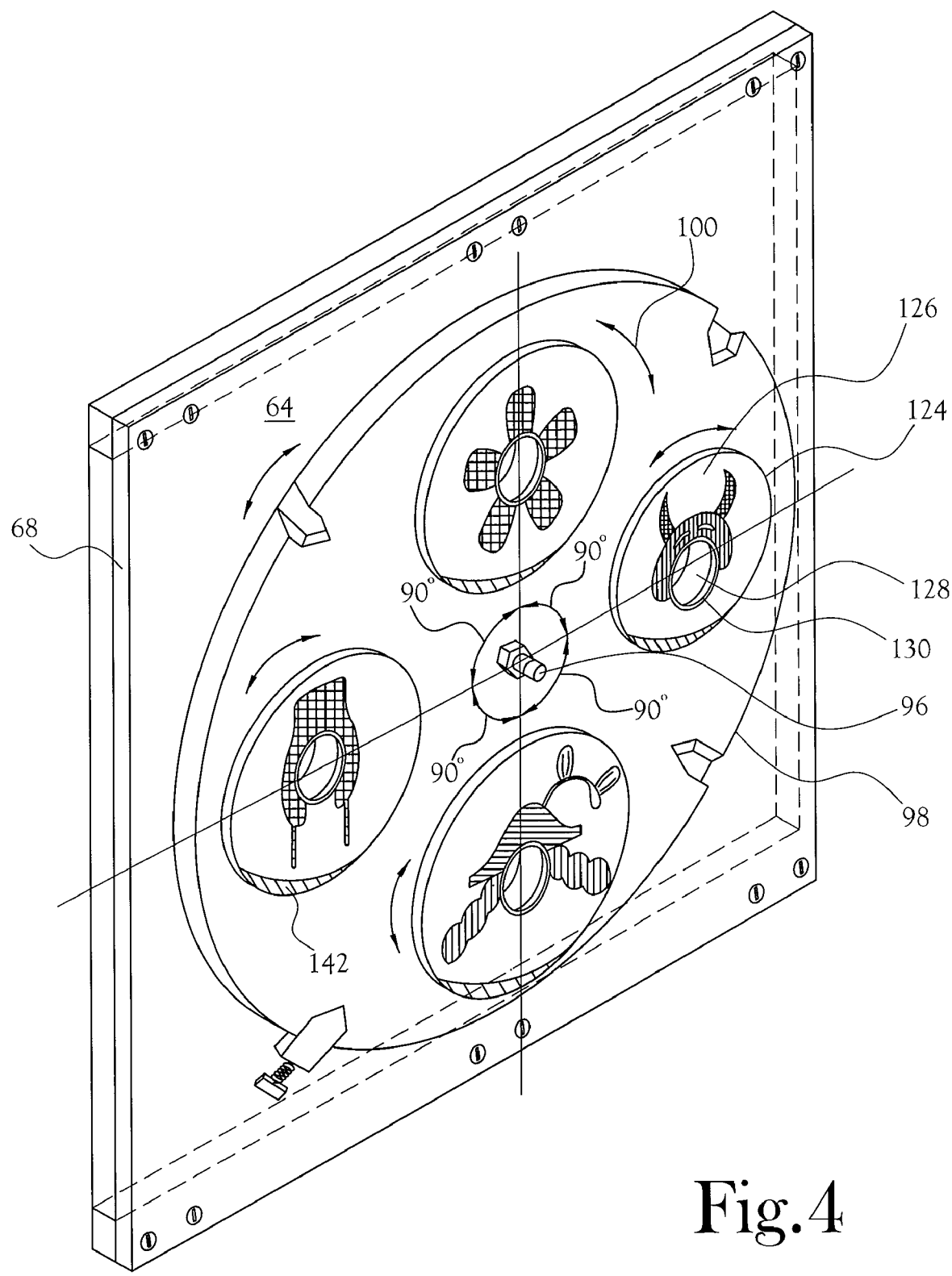
FIG. 4 is a perspective view of a gate having an outer facial surface defined by a single panel.

In a further embodiment of the present invention as seen in FIG. 4, the gate is completed by mounting a unitary face plate, 64, such as a single unitary panel, 68, on the frame as by removable fasteners, such as screws. In any embodiment, the frame and/or the panels and/or face plate may be formed of wood or a rigid polymeric material, or a combination of wood and polymeric material.

The gate of the present invention may be incorporated into a wall, 70, of a pet enclosure, or into a portion of a fence of a pet enclosure, for example. Such gate commonly will be located in alignment with a walkway, if any, leading to the gate, thereby positioning the gate proximate that location about the enclosure which the pet associates with pleasant happenings. Also, when so positioned, the gate is commonly within view of whatever event may be taking place outside the enclosure.

In the several Figures, there are depicted gates of the types discussed hereinabove. In all instances, the gate is provided with at least one portal 72 which extends through the thickness of the gate. The geometry of this portal may be cylindrical, circular oblong or other generally rounded geometry without abrasive aspects. In any event, the internal dimension(s) of the portal are chosen to permit a pet located within the enclosure to extend not materially more than the nose, 74, and eyes, 76, of their face, 78, into or through the portal. Through choice of the internal dimensions of the portal, the extent to which the pet may extend their face into the portal is limited to that extent which permits, no more, or insignificantly more, of the face of the pet than the nose and eyes of the pet into or through the portal. By this means, the pet is provided with a full unimpeded view of an event or events taking place outside the enclosure, but is inhibited from disruptive maneuvers, is somewhat inhibited from uttering objectionable noises, such as barking, and is behaviorally calmed by reason of their satisfaction of viewing the event taking place outside the enclosure, all with continued retention of the pet within the enclosure. It will be recognized that the size of a given portal preferably is selected as a function of the size and physical head and body features of a given pet so as to obtain the desired limitation on the extent of insertion of the pet's face into the portal.

Each portal in the face plate of the present gate is surrounded about its perimeter by the artistic, 80. In the embodiment depicted in FIG. 1, this artistic may be painted on a single panel or extending onto one or more adjacent panels through which its associated portal is defined, or, in a further embodiment the artistic may take the form of a "paste on" decal.

Figure 8:
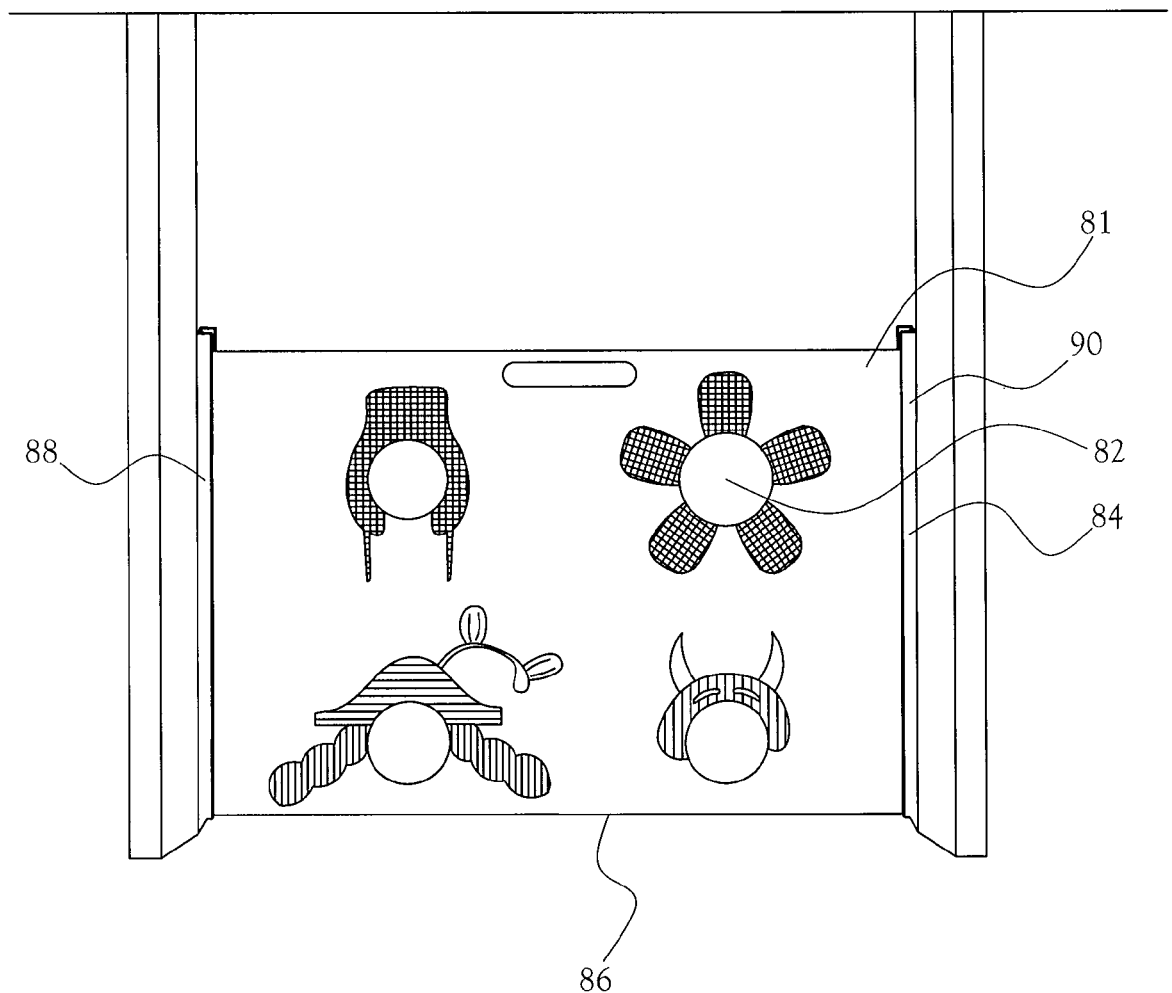

In the embodiment of the gate depicted in FIGS. 3, 4 and 8, the artistic for a given portal may take the form of a self-supporting transparency, 81, (FIG. 3) having an opening, 82, (portal) through its thickness that is of like size and shape as a given portal, 72 (see FIG. 3), in the gate face plate so that the artistic of the transparency may be mounted on the face place in register with a chosen portal in the face plate itself.

In the depicted embodiment of FIG. 8, the transparency is removably mounted on the face plate as by means of a generally rectangular "drop-in" holder, 82. In the depicted embodiment of FIG. (4) 8, the holder may comprise a bottom strip, 86, and first and second side strips, 88, 90, each such side strip being of a "U" shaped cross section 9 (see FIG. 5), with the open side, 92, of the "U" shape facing inwardly of the holder whereby the open side of the "U" shaped strips face one another with an open space, 94, therebetween for the receipt of a transparency between these strips. The spacing between the side strips, in cooperation with the bottom strip of the holder define a horizontally oriented slot type holder, 84, for the slideable receipt of a transparency therein (See FIGS. 5 and 8). Further, the sizing and location of the slot type holder on the face plate positions the portal, 82, through the transparency in register with the portal, 72, (see FIG. 1) in the face plate thereby permitting a pet to urge their nose and eyes through both such registered portals. Because of the added thickness occasioned by overlaying the transparency over a portal of the face plate of the gate, the size and geometrical shape of the registered portals consideration must be given to possible enlargement. Other relatively minor alternation of the registered portals may be in order for defining the extent to which a pet may project their eyes and nose through such overlying portals as provides the desired unimpeded ability of the pet to view events taking place outside the enclosure as will be understood by one skilled in the art, given the present disclosure.

Figure 5:
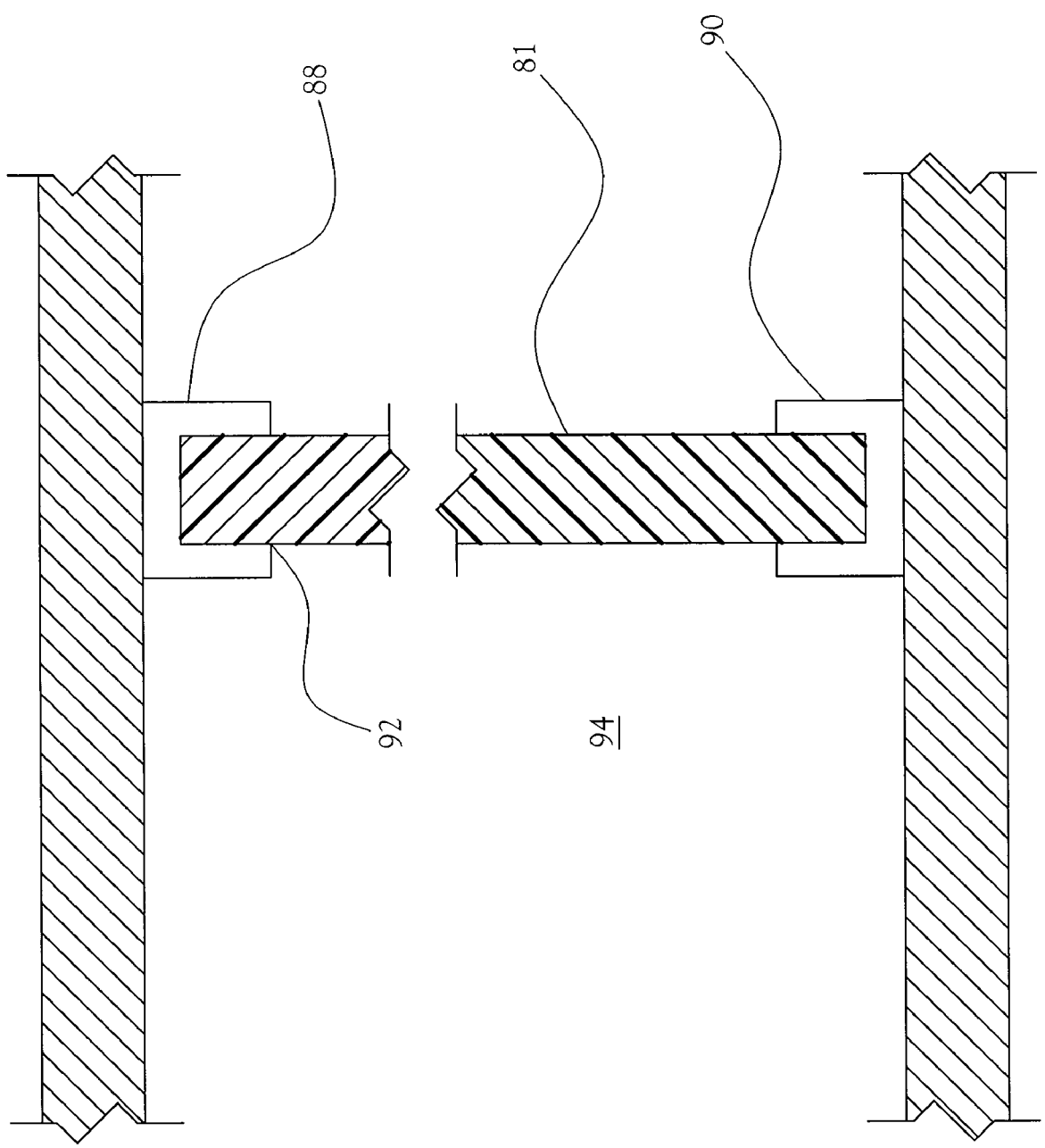
FIG. 5 is a cross-sectional view of a side strip of a transparency holder associated with a gate as depicted in FIG. 4 (A)

From the gate depicted in FIGS. 4,5 and 8 it will be recognized that a given transparency is readily removable from its holder and replaced by a different transparency. For example, a summer flower artistic may have a winter scene or other transparency substituted for such summer flower artistic, all without disruption of any other aspect of the gate.

As desired, in any embodiment of the present invention, multiple portals may be provided at spaced apart locations about the outer facial surface of a gate, with each portal having associated therewith a specific artistic. These multiple portals may be of different sizes to accommodate differently sized pets separately at different times or to simultaneously accommodate differently sized pets.

In a yet further embodiment, as depicted in FIGS. (5) 4 and 6, there may be provided on the face plate of the gate (preferably centrally of the face plate), a shaft 96 which projects outwardly of the outer facial surface of the gate for rotational mounting of a first disc, 98, on the outer facial surface of the gate. A plurality of portals equally spaced apart from one another and co-radial along a circular path, 100, defined on the outer facial surface of the gate about the central shaft, are defined through the thickness of the face plate of the gate. As depicted in FIGS. (5) 4 and 6, in this embodiment, each portal of the array is equidistant from the central shaft so that these portals in the gate face plate are correspondingly aligned with like spaced apart portals, 102, in the first disc, 98, so that rotation of the first disc selectively introduces individual ones of the portals, 102, of the disc, 98, in register with different ones of the portals in the face plate. By this means, rotation of the first disc repositions the artistic associated with the first disc portal, 102, thereby shifting such artistic to become associated with any other of the disc portals.

In accordance with the present invention, the outer perimeter, 106, of each of various portals (portal 102, for example), is surrounded, at least partially, with an artistic, 80, of a unique design. The artistic may be painted directly onto one or more of the panels which make up the gate or it may comprise a "stick on" decal, for example, applied directly to the panel(s) of the facial front surface of the gate. When an artistic loses its enhancement value for its given portal as depicted in FIG. 3, the panel (or multiple panels) onto which the artistic is painted or applied may be extracted and the artistic renewed, or a different artistic may be substituted for the pervious artistic and the panel or multiple panels and the panel bearing the, "renewed" artistic may be reinserted into the gate structure and fastened in the position formerly occupied by the extracted panel or panels. Alternatively, the extracted panel or multiple panels may be replaced with a new panel or panels. By reason of the presence of the artistics associated with the portals, there is developed a visually enhanced overall appearance of the gate which may be readily altered through the choice of artistics so that a normally bland or unsightly gate becomes a focal point for the enclosure and therefore is converted into an object of art to be enjoyed by all visitors within eyesight of the gate. Plus, when a pet extends their nose and eyes, for example, into or through the portal, the artistic and the nose and eyes of the pet combine to define a unique combination of an artistic and pet's nose an eyes. As depicted one or more of the artistics may comprise depicted of flowers, vines and the like oriented around the outer perimeter of one or more of the portals. As desired, an artistic may comprise an arrangement of live greenery. Another suitable artistic may comprise a gathering of plastic flowers and/or greenery adhered to the outer facial surface of the gate, thereby increasing the useful life of the artistic.

One skilled in the art will recognize other artistics suitable for use in the present invention.

Inasmuch as the individual panels of one embodiment of the present gate which define the front facial surface of the gate, are readily removed and replaced, the panels can be replaced to the extent needed to enlarge a portal as a pet grows, or when a pet chews away a portion of the portal such that the portal appears unsightly, or when a new pet arrives and requires a differently-sized portion than any existing portal in the gate, and/or in connection with other factors which might dictate changing a given portal or the location of a given portal through the thickness of the gate.

As noted and as seen in FIG. 1, in one embodiment, the gate is provided with at a single portal extending through the thickness of the gate proximate the bottom rail of the gate frame. Other portals, as desired, may be provided at spaced apart locations about the facial front surface of the gate. (See FIG. 2). By way of example, all the portals may be of the same or substantially the same size if all the contained pets are of approximately the same size and/or biological head makeup. In any event, the largest desired internal diameter of a portal will be that internal diameter which permits at least the largest of the pets to project their individual head into the portal only to the extent that their eyes and nose project sufficiently into the portal as to provide for the pet's eyes to be fully exposed to view event(s) taking place outside the enclosure. When the enclosure houses different size pets (dogs for example), multiple relatively larger size portals may be located proximate the top of the gate where small pets can not reach such portals and smaller sized portal(s) may be provided proximate the bottom of the gate.

With reference to that embodiment of a gate of the present invention as depicted in FIGS. 1-3, in the event a given artistic requires replacement, that panel or panels onto which the artistic is painted may be released from the frame by simply removing those screws which hold the panel(s) within the frame and the loosened panels may be slidably withdrawn from the adjacent ones of the panels. Similarly, in the event the pet(s) chew upon the perimeter of a given portal to the extent that the internal diameter of the portal is too large for the desired control of the extent to which a pet may extend their face or head into such portal, the damaged panel may be slidably extracted and replaced with a new panel having a properly sized portal. Again, in similar manner, where a given pet outgrows the size of a portal and can no longer fit their nose and eyes properly into the portal, that panel or panels which harbor the portal may be extracted and a panel or panels having a larger size portal may be substituted into the frame. This latter event may repeat itself several times over the life time of given pet.

Preferably, in the embodiment depicted in FIGS. 1-3, the internal diameter of a given portal is less than the width of the panel with which the portal is associated so that no panel needs to be cut fully across its width into two pieces when the portal is being cut. Rather, even through the portal may overlie a major position of each of two adjacent panels (to provide a portal of a relatively large internal diameter), desirably neither of these panels is severed into two pieces, thereby facilitating extraction and reinsertion of a given panel into the array of panels which define the gate. Where a pet requires an unusually large size portal, alternatively, one or more of the panels may be chosen to be of a relatively greater width than others of the panels which make up the gate, sufficient to accommodate the cutting of a larger portal through a single panel.

Figure 6:
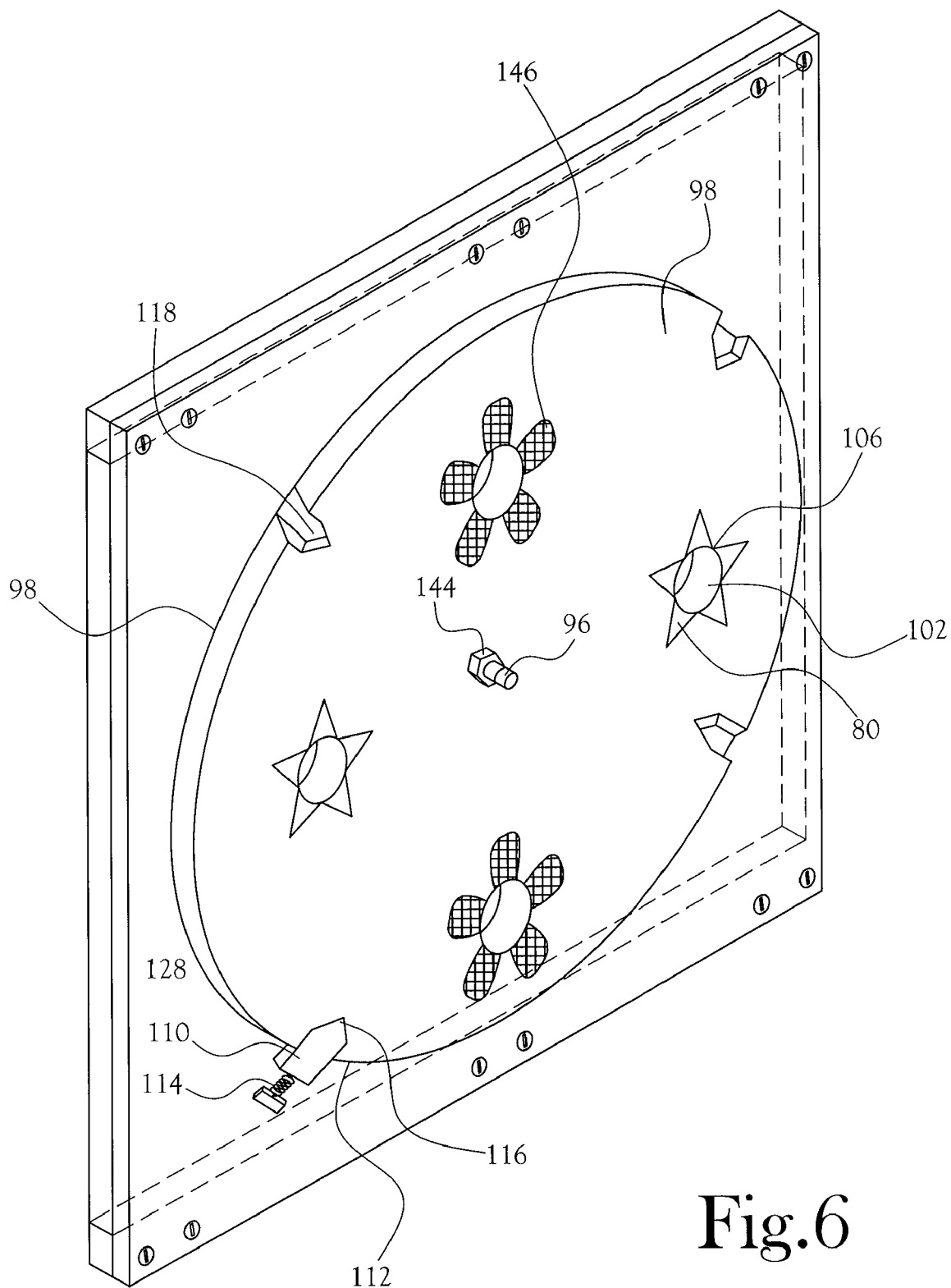
FIG. 6 is a frontal perspective view of a gate having a rotatable support for a plurality of artistics between different portals provided in the gate.
Figure 7:
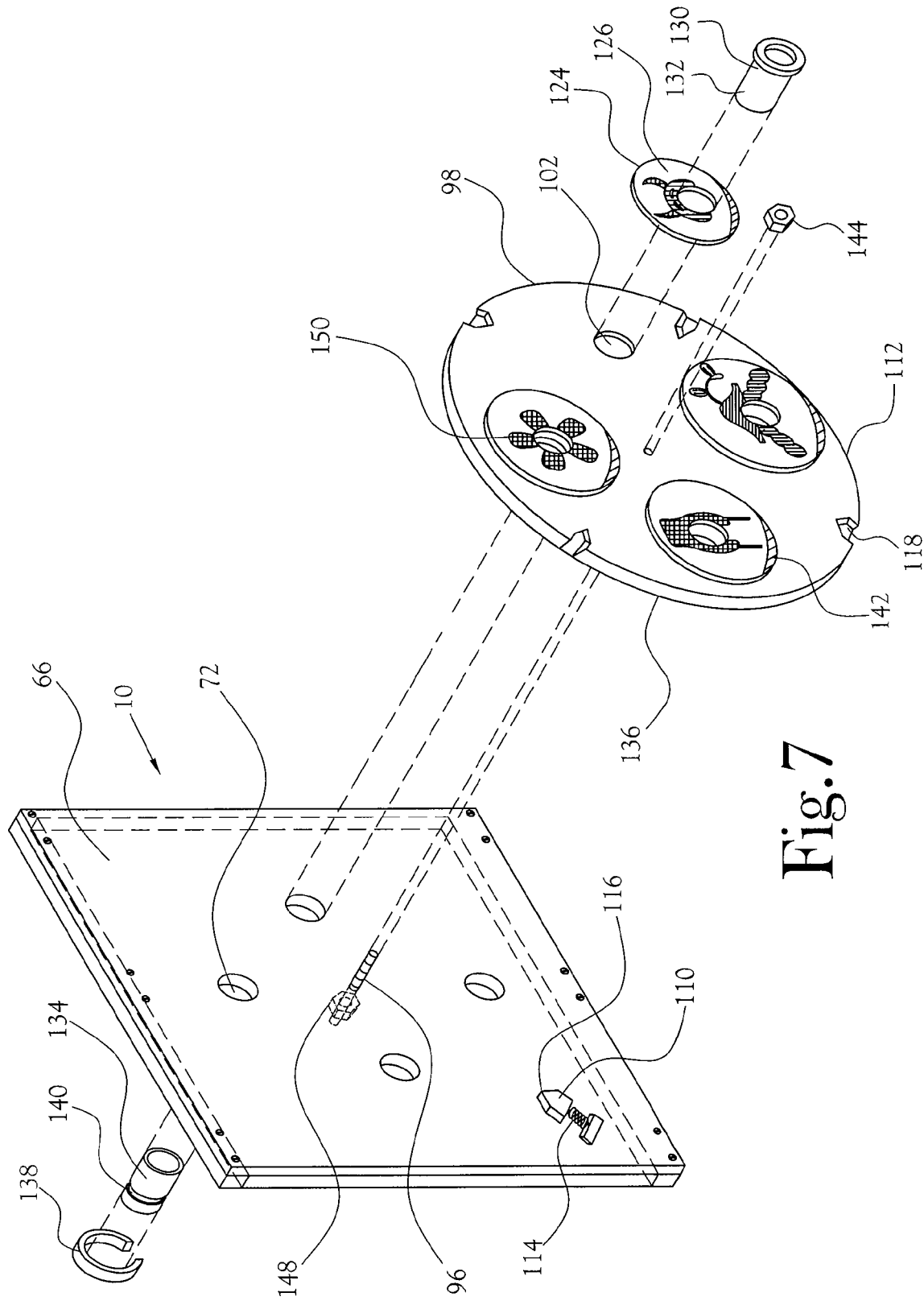
FIG. 7 is an exploded view of one embodiment of a gate of the present invention employing rotable artistics and, FIG. 8 is a representation of a gate having a transparency mounted thereon.

In a still further embodiment, as depicted in FIGS. 4, 6 and 7 the artistics of the present invention may be shifted between different portals 72 in the gate. To this end, as depicted in FIGS. 4,6 and 7, a relatively large first disc 98 is rotatably mounted on the outer facial surface 66 of a gate which has a plurality of portals 72 defined therein. In this embodiment, the relatively large first disc 98 is manually rotatable on a shaft 96 which is mounted centrally of the facial surface of the gate and which projects from the outer facial surface of the gate to rotatably receive and support the large first disc in a plane parallel to the facial surface of the gate. As seen in FIGS. 6 and 7, the rotational movement of the first disc may be halted at a given location as by a latch, 110, mounted on the gate adjacent the outer perimeter, 112, of the first disc, 98, and a spring, 114, loaded to urge a tapered end, 116, thereon into a tapered notch, 118, defined in the outer perimeter of the disc. In the present embodiment, this latch is located on the gate at a location wherein the catch engages and stops rotation of the first disc when the portals 102 of the first disc are in register with the portals of the gate so that a pet may push their nose and eyes through the registered portals of the gate and the first disc.

In the embodiment depicted in FIG. (5) 4, the portals in the gate are spaced apart at 90 degree intervals along a circular line 100 having its central pivot point coincident with the central shaft 96. Further, the outer face of the large disc is likewise provided with substantially like-sized portals which are similarly located in spaced apart relationship to one another at respective locations on the large disc whereby such like-sized portals in the large first disc may register with respective one of the portals defined in the gate so that rotation of the large disc about the shaft 96 will position respective ones of the portals defined in the disc in register with respective ones of the portals defined in the gate.

Further in the embodiment depicted in FIGS. 4 and 7, there is provided a plurality of relatively small second discs, 124, each having an artistic on an outer surface, 126, of such second disc. Centrally of each such second disc, there is provided a circular throughbore, 128, (portal) adapted to receive therein a flanged tubular bearing, 130, having an internal diameter chosen to permit the limited insertion of the nose and eyes of a pet in or through the bearing, hence through the artistic associated with the second disc.

In turn, the barrel portion, 132, of the flanged bearing is passed through a respective portal in the large first disc to the extent that a relatively short portion, 134, of the barrel of the bearing projects outwardly from the rear surface, 136, of the second disc to receive thereon a snap ring, 138, fitted within a groove, 140, that circles the outer circumference of the barrel portion of this flanged bearing. In this manner, each of the plurality of small second discs, with their respective artistic will rotate by gravity, about its respective bearing upon rotation of the large first disc. To ensure that each artistic associated with one of the small second discs retains their desired rotational orientation, each of the small second discs may be provided with a counter weight, 142, at that location on the second disc which will cause the second disc to seek the aforesaid desired rotational position, irrespective of the rotational position of the large first disc about the shaft. By this means, each of the artistics retains its desired orientation relative to the gate and the portal of each small second disc (and its bearing), is in register with respective ones of the portals in the large first disc.

Assembly of the embodiment of the invention as depicted in FIG. (5) 7 includes mounting of the large first disc, with its portals, on the shaft mounted centrally of the outer facial surface of the gate. This may be accomplished by inserting a shaft 96 through the center of the gate face plate and application of a lock nut, 144, or other suitable fastener on an externally threaded portion of the shaft which projects rearwardly through the gate.

Further, assembly of the embodiment includes insertion of the barrel portion of a flanged bearing through the portal of each of the small second discs, inserting the projecting barrel portion of each flanged bearing through a respective portal in the large first disc and anchoring the tubular bearing against escape from its respective portal on the first disc. The length of the flanged bearing is chosen to permit a small portion of the barrel portion of the bearing to project outwardly from the rear face of the gate a distance sufficient for the application of a fastener such as a snap ring, frictionally encompassing the outer diameter of the bearing barrel for rotatably securing the small second disc to the large second disc.

In this alternative embodiment of the present invention, it will be recognized that when it is desired to change the location, relative to the gate, the artistics defined on the small second discs, one need only to release the spring loaded catch and rotate the large first disc by that degree of rotation with will realign the registered portals of the first and second disc with respective ones of the portals in the large first disc. (e.g., 90 degrees rotation).

In similar manner, when it is desired to replace a given one of the artistics with a refreshed or new artistic, on need only remove the snap ring which retains such second disc on the large first disc, and replace such removed second disc with a new second disc having a new artistic or with a refreshed artistic using the original extracted second disc. No extraction of the panels of the gate is required when changing artistics employing this alternative embodiment.

While the present invention has been illustrated by description of several embodiments and while the illustrated embodiments have been described in considerable detail, it is not the intention of the applicant to restrict or in any way limit the scope of the appended Claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concepts.

What is claimed is:

1. A gate for a pet enclosure comprising,
a frame,
at least one panel anchored on said frame and defining a substantially continuous outer facial surface of the gate,
said outer facial surface being disposed facing outwardly of said enclosure,
at least one portal defined through the thickness of said at least one panel of said gate,
at least one artistic graphic extending around at least a substantial portion of the perimeter of said at least one portal
a relatively large first disc rotatably mounted on said outer facial surface of said gate, whereby said first disc includes an outer facial surface disposed substantially parallel with said outer facial surface of said gate,
at least one relatively small second disc rotatably mounted on said outer facial surface of said first disc,
an artistic graphic associated with said at least one relatively small second disc,
at least one portal defined in said at least one panel of said gate,
at least one portal defined in said at least one second disc, said at least one portal in said at least one panel of said gate and said at least one portal in said at least one second disc being registerable with one another of being of an internal diameter suitable for the projection through said registered portals of not significantly more than the nose and eyes of a pet, whereby said pet is provided with a full unimpeded view of an event taking place outside said enclosure.

2. The gate of claim 1 and including a plurality of portals defined in said least one panel of said gate and a plurality of portals defined in said large first disc, respective ones of said plurality of portals defined in said at least one panel of said gate being registerable with respective ones of said plurality of portals defined in said large first disc, said registered ones of said pluralities of portals exhibiting a substantially common internal diameter whereby not significantly more than the nose and eyes of a pet may be inserted into at least one of said registered portals and said pet is provided with a substantially unimpeded view of an event taking place outside said enclosure.

3. The gate of claim 2 wherein each of said plurality of small second discs is adapted for free-wheeling rotation about a longitudinal axis thereof relative to said large first disc.

4. The gate of claim 3 and including a dead weight attached to each of said plurality of portals in said small second disc at a location on said each of said plurality of portals of said small second disc whereby each of said small second discs seek a rotational position preselected to present said artistic graphic associated with each of said plurality of portals in a desired horizontal attitude.

* * * * *